United States Patent
Tyson (12) United States Patent (10) Patent No.: US 7,010,262 B2
(45) Date of Patent: Mar. 7, 2006

(54) TECHNIQUES FOR CIRCUMVENTING JAMMING OF GLOBAL POSITIONING SYSTEM RECEIVERS

(75) Inventor: Scott M. Tyson, Albuquerque, NM (US)

(73) Assignee: The Johns Hopkins University, Baltimore, MD (US)

(*) Notice: Subject to any disclaimer, the term of this patent is extended or adjusted under 35 U.S.C. 154(b) by 445 days.

(21) Appl. No.: 10/216,005

(22) Filed: Aug. 9, 2002

(65) Prior Publication Data

US 2003/0054756 A1 Mar. 20, 2003

Related U.S. Application Data

(60) Provisional application No. 60/313,038, filed on Aug. 17, 2001.

(51) Int. Cl.
*H04K 3/00* (2006.01)

(52) U.S. Cl. ................. 455/1; 342/357.06; 342/357.02

(58) Field of Classification Search .................... 455/1, 455/456, 410, 3.02, 3.04, 404.2, 414.2, 303; 342/357.02, 458, 450, 357.09, 357.14, 357.12, 342/357.06
See application file for complete search history.

(56) References Cited

U.S. PATENT DOCUMENTS

| | | | | |
|---|---|---|---|---|
| 5,587,715 A | * | 12/1996 | Lewis | 342/357.03 |
| 5,822,429 A | * | 10/1998 | Casabona et al. | 380/252 |
| 6,031,487 A | * | 2/2000 | Mickelson | 342/357.12 |
| 6,300,898 B1 | * | 10/2001 | Schneider et al. | 342/357.09 |
| 6,430,416 B1 | * | 8/2002 | Loomis | 455/456.1 |
| 6,445,344 B1 | * | 9/2002 | Wise et al. | 342/458 |
| 6,546,258 B1 | * | 4/2003 | Nohara et al. | 455/456.1 |
| 6,639,541 B1 | * | 10/2003 | Quintana et al. | 342/18 |
| 6,778,135 B1 | * | 8/2004 | Warloe et al. | 342/357.12 |
| 2002/0053989 A1 | * | 5/2002 | Lin et al. | 342/357.14 |
| 2003/0022656 A1 | * | 1/2003 | Hinnant et al. | 455/410 |
| 2003/0208317 A1 | * | 11/2003 | Chang et al. | 701/213 |

* cited by examiner

*Primary Examiner*—Tilahun Gesesse
*Assistant Examiner*—Tan Trinh
(74) *Attorney, Agent, or Firm*—Albert J. Fasulo, II (57) ABSTRACT

A method and apparatus for circumventing jamming of receivers for a global positioning system (GPS) include determining that a receiver is being jammed by a jamming signal not originating from the GPS. A first signal is transmitted from a portable unit including the receiver to a component of a second positioning system that is different from the GPS. A second signal is received from the second positioning system. The second signal includes data that indicates a position for the portable unit determined in the second positioning system based at least in part on the first signal.

19 Claims, 4 Drawing Sheets

TECHNIQUES FOR CIRCUMVENTING JAMMING OF GLOBAL POSITIONING SYSTEM RECEIVERS

CROSS-REFERENCE TO RELATED APPLICATIONS

This application claims the benefit of Provisional Application No. 60/313,038, filed on Aug. 17, 2001, the entire contents of which are hereby incorporated by reference as if fully set forth herein, under 35 U.S.C. §119(e).

STATEMENT OF GOVERNMENTAL INTEREST

This invention was made with Government support under Contract No. SC0043-96-0035 awarded by the Department of the Air Force. The Government has certain rights in the invention.

BACKGROUND OF THE INVENTION

1. Field of the Invention

The present invention relates to use of the Global Positioning System (GPS); and, in particular, to techniques for circumventing jamming of GPS receivers.

2. Description of the Related Art

The Global Positioning System (GPS) is widely known and used to provide precision positioning information anywhere on Earth. GPS includes a constellation of earth orbiting satellites that transmit coded signals, and a portable unit called a GPS receiver to receive those coded signals. The GPS receiver includes a radio frequency receiver, a processor, a clock, and data used to determine a position of the portable unit based on signals received from four or more of the GPS satellites. The GPS receiver measures raw ranges to the four or more satellites and solves for a position and clock offset that fits the measured ranges. Because the signals emitted by the satellites are digital, the system works even at low power. The low power is an advantage for conserving power on the satellites that must transmit over tens of thousands of miles from an orbit about 12,000 miles above the surface of the Earth. Positions can be determined within a few tens of meters both horizontally and vertically.

The high precision position information provided by GPS is valuable in a number of commercial and military scenarios. Opponents hostile to an enterprise's commercial or military goals might decide to deny the benefits of GPS positions to the enterprise by interfering with the GPS transmissions. Such an opponent may attempt to jam the GPS receivers with spurious signals. The spurious signals might have large enough amplitude to bury the low power GPS signals and thus prevent the determination of range to one or more of the GPS satellites. The spurious signals might spoof the GPS receiver by including data that appears to be from GPS satellites but that gives one or more raw ranges that prevent a proper solution for position and clock offset. Without positioning information, the enterprise may be unable to achieve one or more goals.

Based on the foregoing description, there is a clear need for a system that would circumvent jamming of global positioning system receiver so that an enterprise's goals can still be achieved in the presence of such jamming.

SUMMARY OF THE INVENTION

Techniques are provided for circumventing jamming of receivers for a global positioning system (GPS). In one aspect of the invention, techniques include determining that a receiver is being jammed by a jamming signal not originating from the GPS. A first signal is transmitted from a portable unit including the receiver to a component of a second positioning system that is different from the GPS. A position for the portable unit is determined in the second positioning system, based at least in part on the first signal. A second signal is transmitted from the second positioning system to the portable unit. The second signal includes data that indicates the position for the portable unit.

In another aspect of the invention, techniques include determining that a receiver is being jammed by a jamming signal not originating from the GPS. A first signal is transmitted from a portable unit including the receiver to a component of a second positioning system that is different from the GPS. A second signal is received from the second positioning system. The second signal includes data that indicates a position for the portable unit determined in the second positioning system, based at least in part on the first signal.

In another aspect of the invention, techniques include receiving a first signal at a component of a second positioning system that is different from the GPS. The first signal is received from a portable unit including a receiver for the GPS. The portable unit has determined that the receiver is being jammed by a jamming signal not originating from the GPS. A position for the portable unit is determined in the second positioning system based at least in part on the first signal. A second signal is transmitted to the portable unit. The second signal includes data that indicates the position for the portable unit.

In another aspect of the invention, a system includes a first positioning system that provides a receiver with a first position having a first precision. The system includes a second positioning system different from the first positioning system that determines a second position having a second precision for a transmitter. The system also includes a portable unit including a receiver for the first positioning system and a transmitter for the second positioning system. The portable unit is configured for determining that the receiver is being jammed by a jamming signal not originating from the first positioning system. A first signal is transmitted from the portable unit to the second positioning system. A second signal is received at the portable unit from the second positioning system. The second signal includes data that indicates the second position for the portable unit determined in the second positioning system based at least in part on the first signal.

In another aspect of the invention, an apparatus includes a receiver for obtaining a first position of the apparatus having a first precision from a first positioning system. The apparatus includes a transmitter for obtaining a second position of the apparatus having a second precision from a second positioning system different from the first positioning system. The apparatus also includes a processor configured for determining that the receiver is being jammed by a jamming signal not originating from the first positioning system. The processor causes a first signal to be transmitted to the second positioning system. The processor receives a second signal from the second positioning system. The second signal includes data that indicates the second position determined in the second positioning system based at least in part on the first signal.

These techniques allow a position obtained from the second positioning system to be used by an operational unit associated with the portable unit to achieve its goals during the absence of a usable GPS position because of jamming.

In most embodiments, the precision of the position obtained from the second provisioning system is sufficient to support the goals of the operational unit.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for circumventing jamming of GPS receivers is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1. Operational Context

Embodiments of the invention are described in the context of the Global Positioning System, but the invention is not limited to this context. The invention may be used in any high precision positioning system that uses passive receivers on portable units, which are subject to jamming by spurious signals.

Figure 1:
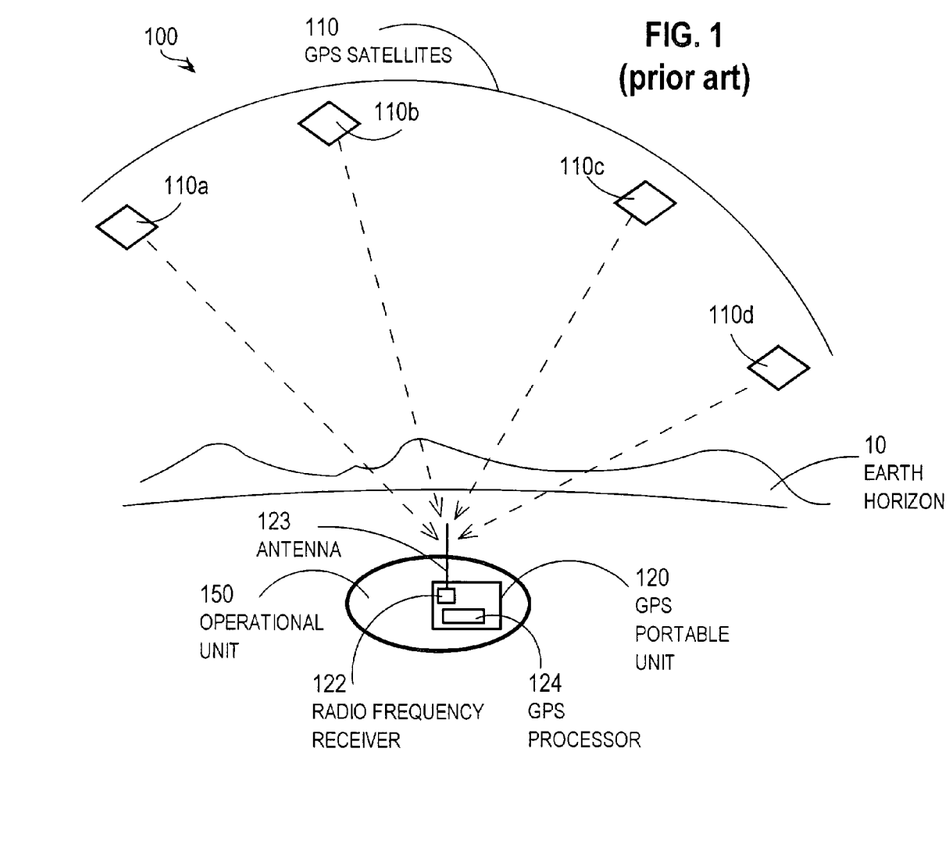
FIG. 1 is a block diagram that illustrates use of a conventional global positioning system by an operational unit.

FIG. 1 is a block diagram that illustrates use of a conventional global positioning system (GPS) 100 by an operational unit 150. The GPS 100 includes multiple GPS satellites 110 and a GPS portable unit 120.

The operational unit 150 is any unit of organization in an enterprise, including a person, a group of people, equipment or machinery, one or more vehicles, and one or more aircraft, among others. An operational unit is capable of holding, carrying, attaching to, or containing the GPS portable unit 120. The operational units are disposed on or a few miles above the Earth, which is represented in FIG. 1 by the horizon 10.

When viewed relative to the operational unit 150, several satellites 110a, 110b, 110c, 110d are above the Earth's horizon 10. The satellites 110 broadcast GPS signals, represented in FIG. 1 by the broken-line arrows, which include data indicating time of transmission, identity of the transmitting satellite, and information about the satellite orbit so that the satellite's position is precisely known.

The GPS portable unit 120 includes a radio frequency receiver 122 tuned to the radio frequencies of the GPS transmissions and a GPS processor 124. The radio receiver 122 includes an antenna 123 that picks up the GPS transmissions. The GPS processor 124 includes a computer processor, a computer readable medium storing data, and a clock. The GPS processor 124 compares the signals received with a time from its internal clock and data stored in the computer-readable medium to determine raw ranges to the visible satellites, e.g., raw ranges to satellites 110a, 110b, 110c, 110d. The GPS processor 124 converts the raw ranges to a clock offset and a position of the portable unit. Two levels of precision can be achieved for position and clock offset, depending on the type of the GPS processor 124 and which signals from the GPS satellites 110 are processed.

2. Structural and Functional Overview

Figure 2:
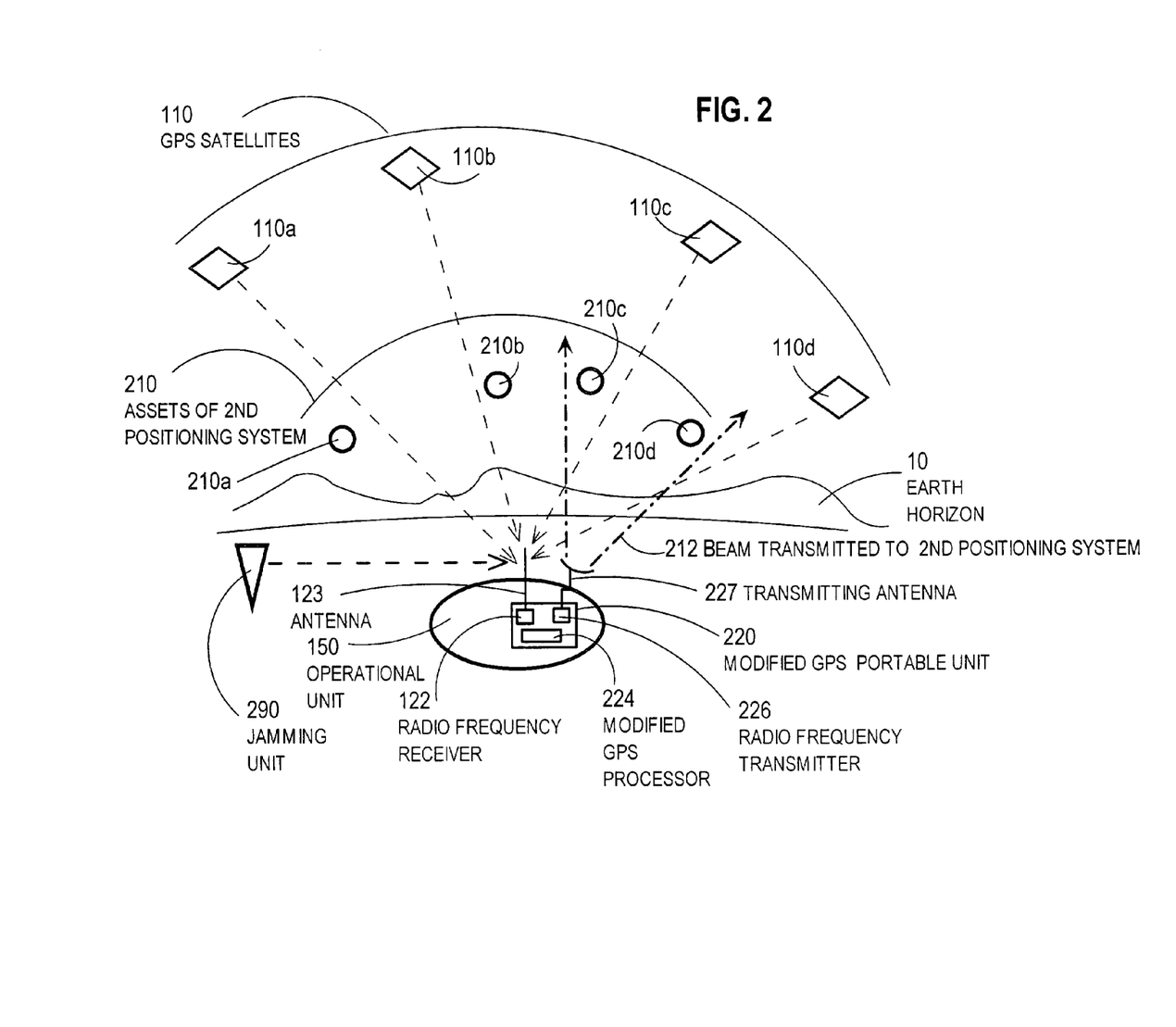
FIG. 2 is a block diagram that illustrates use of a second positioning system when the global positioning system is subjected to jamming, according to an embodiment.

FIG. 2 is a block diagram that illustrates use of a second positioning system when the global positioning system is subjected to jamming, according to an embodiment. The GPS satellites 110, GPS transmissions (broken-line arrows), Earth horizon 10, and operational unit 150 are as described above with reference to FIG. 1. The radio frequency receiver 122 and antenna 123 are also as shown in FIG. 1. However, a modified GPS portable unit 220 replaces the GPS portable unit 120 of FIG. 1. The modified GPS portable unit 220 includes a modified GPS processor 224 that includes the GPS processor 124 of FIG. 1. The modified GPS portable unit 220 also includes a radio frequency transmitter 226, with a transmitting antenna 227.

Also shown in FIG. 2 are assets 210 of a second positioning system that relies on active transmissions from a transmitter in a portable unit. Any system known in the art at the time the portable units are deployed may be used. Several such systems are known in the art at the time of this writing. For example, in some embodiments, the second positioning system can be the threat warning and attack reporting system (TW/ARS) currently under development by the United States Air Force. In such embodiments, the assets 210 include satellite receivers in lower Earth orbit than the GPS satellites 110.

In some embodiments, the second positioning system relies on one or more assets 210 with directional receivers that can determine a direction ("bearing") to a transmitter. When viewed relative to the operational unit 150, one or more assets 210a, 210b, 210c, 210d are above the Earth's horizon 10. The assets 210 may be satellites, or non-satellite assets, or some combination. For example, in some embodiments the assets may be aircraft, such as helicopters and airborne warning and control system (AWACS) aircraft. When a signal transmitted by a transmitter is received at an asset 210, the asset can determine a bearing to the transmitter. For example, when a signal transmitted by transmitter 226 is received at asset 210c, asset 210c can determine a bearing to transmitter 226. A position for the transmitter can be determined based on the measured bearing, the position of the asset, and some additional information.

The additional information may be the altitude of the transmitter. The altitude of the transmitter can be included in the signal sent to the asset, or an altitude can be assumed. For example, an altitude of zero above ground is assumed for ground units. The additional information may be the bearing to the transmitter from an asset 210 in another location. The position is inferred to be the closest location where the two lines through the two asset positions with the two bearings come closest to each other. The more bearings that can be obtained, the better the precision of the position can be determined. In some embodiments, the bearing from an asset in another location can be obtained by a different asset, such as asset 210d. In such embodiments, there is some communication among the assets 210; for example, asset 210c transmits its information to asset 210d. For security, the communication may be encrypted. If the assets 210 are moving, the bearing from an asset in another location can be obtained by the same asset, e.g. 210c, at a later time. For such embodiments, the operational unit 150 is assumed to be stationary; or, if the operational unit 150 is moving, its speed and direction are included in the signals transmitted to the assets.

Also shown in FIG. 2 is a hostile jamming unit 290 of a competing enterprise. The jamming unit 290 sends spurious signals, represented by the thick broken-line arrow, that are picked up at the radio receiver 122. The spurious signals prevent a GPS processor, such as GPS processor 124 in FIG. 1, from determining the position of the portable unit; and, thus, the spurious signals interfere with the goals of the associated operational unit 150.

According to an illustrated embodiment of the invention, when the modified GPS processor 224 determines that the receiver 122 is being jammed with spurious signals that did not originate with the GPS satellites 110, the modified GPS processor 224 generates one or more signals that are transmitted over radio frequency transmitter 226 to one or more assets 210 of the second positioning system. The assets 210 of the second positioning system determine a position for the modified GPS portable unit 220 based at least in part on the transmitted signals. One or more assets 210 of the second positioning system then transmit one or more response signals that includes data indicating the position of the modified portable unit 220. Thus the modified GPS portable unit 220 uses the second positioning system to allow the associated operational unit 150 to achieve its goals.

In some embodiments, the precision of position obtained from the second positioning system is not as good as the precision from the GPS. However, in most embodiments, the precision is sufficient to support the goals of the operational unit 150. In almost all embodiments, the precision of positions from the second positioning system is sufficient to be better than an absence of any positional information from the second positioning system. In some embodiments, the response sent to the modified GPS portable unit includes data about the precision of the position computed by the second positioning system.

In some embodiments, the signal transmitted to the second positioning system includes data that authenticates the portable unit as an authorized user of the second positioning system. In such embodiments, the second positioning system performs authentication and authorization of the portable unit before transmitting the response signals with the position of the portable unit.

If deemed desirable, one or more of the assets 210 can request additional transmissions from the portable unit 220; for example to increase the number of bearings used to solve for the position or change in position of the portable unit 220.

In the illustrated embodiment, the antenna 227 of the transmitter 226 of the modified GPS portable unit 220 is configured to form a narrow beam 212 through which the signals are transmitted to assets 210 of the second positioning system. An advantage of this embodiment is that operational units associated with the jamming unit 290 do not intercept the signals. In other embodiments, the antenna 227 is configured to broadcast the signals transmitted to the assets of the second positioning system, rather than to form a narrow beam. Information about the operational unit 150 is encrypted to keep such information secure against interception by hostile operational units.

In some embodiments, the response signals are transmitted at radio frequencies that use the same radio frequency receiver 122 and antenna 123 as used in the GPS system, but do so at high enough power to overcome the effects of jamming. In some embodiments, the response signals are transmitted at radio frequencies that use a different receiver or different antenna, or both, from the radio frequency receiver 122 and antenna 123 of the conventional GPS portable unit 120.

In some embodiments, the assets 210 that transmit response signals to the modified GPS portable unit 220 do so in narrow beams directed along the bearings to the operational unit 150, so that units associated with the jamming unit 290 do not intercept the response signals. An advantage of the narrow beam is that it concentrates power from the assets 210 on the modified GPS portable unit 220, increasing the amplitude received at radio frequency receiver 122. In some embodiments, the response signals are broadcast, rather than sent through a narrow beam. In some embodiments, information about the operational unit 150 is encrypted to keep such information secure against interception by hostile operational units.

3. Method of Circumventing Jamming

Figure 3:
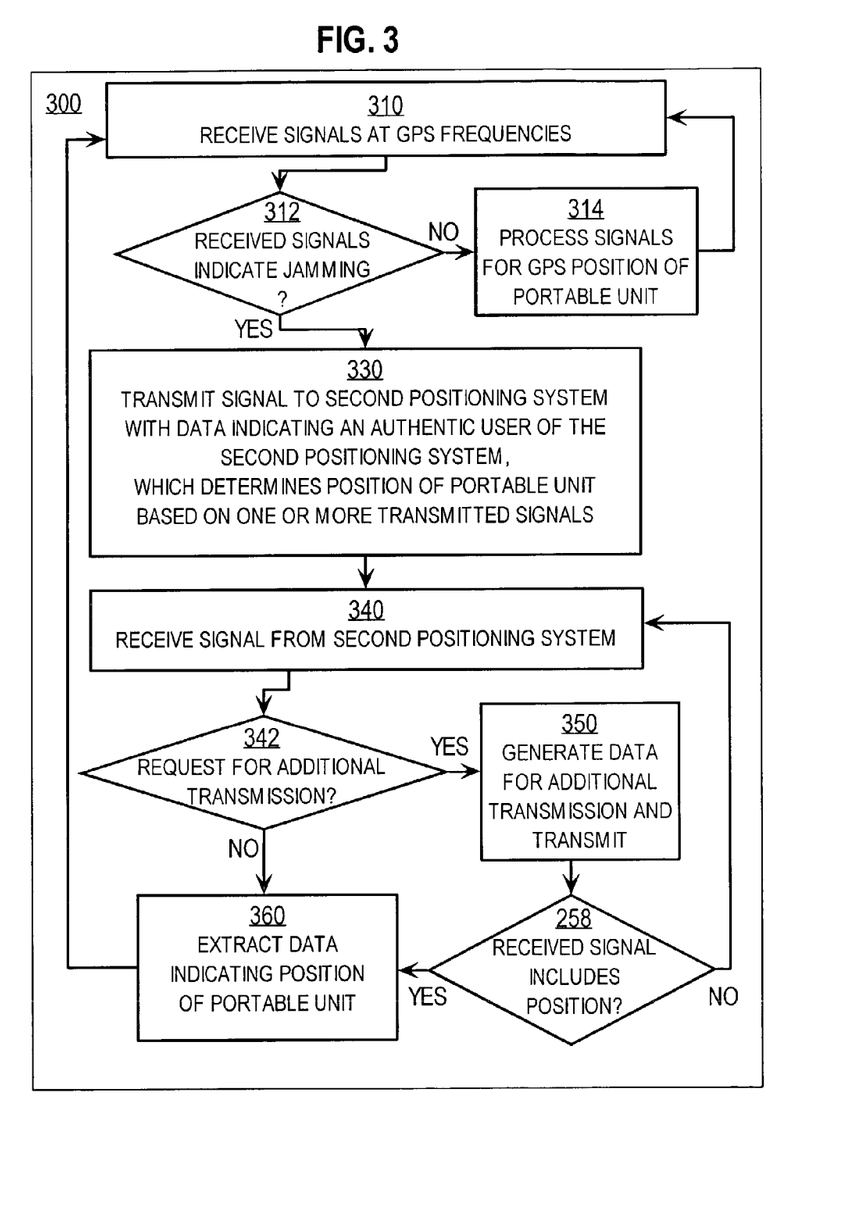
FIG. 3 is a flowchart that illustrates a method for circumventing jamming of a global positioning system, according to an embodiment.

FIG. 3 is a flowchart that illustrates an embodiment 300 of a method for circumventing jamming of a global positioning system. Although steps are shown in FIG. 3 in a particular order, in other embodiments the steps may be performed in a different order, or overlapping in time.

In step 310, a portable unit receives signals at GPS frequencies. For example, modified GPS portable unit 220 receives signals at radio frequency receiver 122 from GPS satellites 110a, 110b, 110c, 110d above the horizon 10 and from jamming unit 290.

In step 312, it is determined whether the signals indicate jamming. Any method known at the time the modified GPS portable unit is built may be used to detect jamming. Several methods are currently known. For example, if the signals contain random data, no satellite identification information can be detected; and the signals can be deemed to be spurious jamming signals. As another example, if no solution for position and clock offset can be obtained, or if the solution includes an absurd position or clock offset, then the signals can be deemed to include spurious jamming signals. In the illustrated embodiment, this determination is made in the modified GPS processor 224.

If it is determined in step 312 that the received signals do not indicate jamming, then control passes to step 314 to process signals for GPS position of the portable unit. For example, a GPS position is obtained for the modified GPS portable unit 220. In the illustrated embodiment this determination is made in a GPS processor, such as processor 124, included in the modified GPS processor 224. Control then passes back to step 310 to continue receiving signals at GPS frequencies.

If it is determined in step 312 that the received signals do indicate jamming, then control passes to step 330. In step 330, a signal is generated and transmitted that includes data used to authenticate and authorize the portable unit as an authorized user of the positioning system. The signal may also include data that indicates other information about the portable unit or associated operational unit. For example, the signal may include data that indicates the altitude of the portable unit 150 or the speed and direction of the portable unit 150. In some embodiments, the signal may include data about the operational unit, such as its identification, its health (e.g., listing damaged subsystems), and its status relative to achieving its goal (looking for target, target found). Step 330 also performs any encryption of data to be included in the signal. In the illustrated embodiment, the modified GPS processor 224 generates and encrypts the data for the signal and causes the radio frequency transmitter 226 to transmit the signal to one or more assets 210 of the second positioning system. In some embodiments, the modified GPS processor 224 determines the direction of the jamming signal and controls the antenna 227 of the radio frequency transmitter 226 to direct a narrow beam away from the jamming unit, and toward one or more assets (e.g., assets 210c, 210d) of the assets 210 of the second positioning system.

The second positioning system determines the position of the portable unit based at least in part on the signal transmitted from the portable unit. For example, in some embodiments, the assets 210 decrypt the data, perform authentication and authorization, determine raw ranges from the portable unit, and solves for a position and clock offset. In some embodiments, the assets 210 decrypt the data, perform authentication and authorization, determine bearing to the portable unit, and determine additional information from the portable unit. In the illustrated embodiment, for purposes of illustration, it is assumed that asset 210c decrypts the data, performs authentication and authorization, determines a bearing to the transmitter 226 and uses an altitude of zero above ground for determining a position for the transmitter 226.

In step 340, a response signal is received from the second positioning system. For example, in the illustrated embodiment, a response signal is received by receiver 122 of the modified GPS portable unit 220, in a high-power narrow beam from asset 210c of the second positioning system, which does not impinge on the jamming unit 290. For purposes of illustration, it is assumed that the response signal from asset 210c includes encrypted data that indicates a request for an additional transmission that includes health and status of the associated operational unit 150 and altitude of the modified GPS portable unit 220.

In step 342, it is determined whether the response signal includes a request for an additional transmission. Some data may be decrypted to perform step 342. If the response signal includes a request for an additional transmission, control passes to step 350 to generate and transmit an additional signal. If not, control passes to step 360 to extract the position of the modified GPS portable unit 220 from the response. After step 360, control passes back to step 310 to monitor signals at GPS frequencies. In embodiments that do not request additional transmissions, steps 342, 350, 358 may be omitted and control passes from step 340 to step 360.

In the illustrated embodiment, control passes to step 350 and the modified GPS processor 224 generates another signal that includes the altitude of the modified GPS portable unit 220, and the health and status of operational unit 150. The modified GPS processor then encrypts the data and causes the transmitter 226 to transmit the signal and causes the antenna 227 to transmit the signal over a narrow beam 212 directed away from the jamming unit 290. Control then passes to step 258.

In step 258 it is determined whether the received response signal includes position for the modified GPS portable unit. If not, control passes back to step 340 to receive the next response signal from the second positioning system. If so, control passes to step 360 to extract the position of the modified GPS portable unit 220 from the response.

In the illustrated embodiment, the response does not include a position for the modified GPS portable unit 220, so control passes to step 340 to receive the next response signal from the second positioning system.

Meanwhile, in the illustrated embodiment, based on the bearing of the additional signal transmitted in step 350 and the data that indicates altitude in that signal, asset 210c of the second positioning system has decrypted the data, performed authentication and authorization, and computed a revised position for the modified GPS portable unit 220. The second positioning system has also used any information obtained about the health and status of the operational unit 150. The revised position is sent in a second response signal transmitted by asset 210c. It is assumed for purposes of illustration, that the precision of the revised position is also computed and included in the second response signal transmitted by asset 210c. In step 340, the second response signal is received from asset 210c by the receiver 122 of the modified GPS portable unit 220.

In step 342, it is determined that the received signal does not include a request for an additional transmission; and control passes to step 360. In step 360, data is decrypted, if neeeded, and the revised position is extracted from the second response signal by the modified GPS processor 224. It is assumed for purposes of illustration, that the precision of the revised position is also extracted from the second response signal by the modified GPS processor 224. Control then passes back to step 310 to monitor signals at GPS frequencies.

In following steps, not shown, the position of the modified GPS portable unit 220 is used by the operational unit 150 to achieve its goals. In most embodiments, the precision of the position obtained from the second provisioning system is sufficient to support the goals of the operational unit 150 during the absence of a usable GPS position. Use of the illustrated embodiments also allows inventorying or role calling of friendly assets, or both.

4. Hardware Overview

Figure 4:
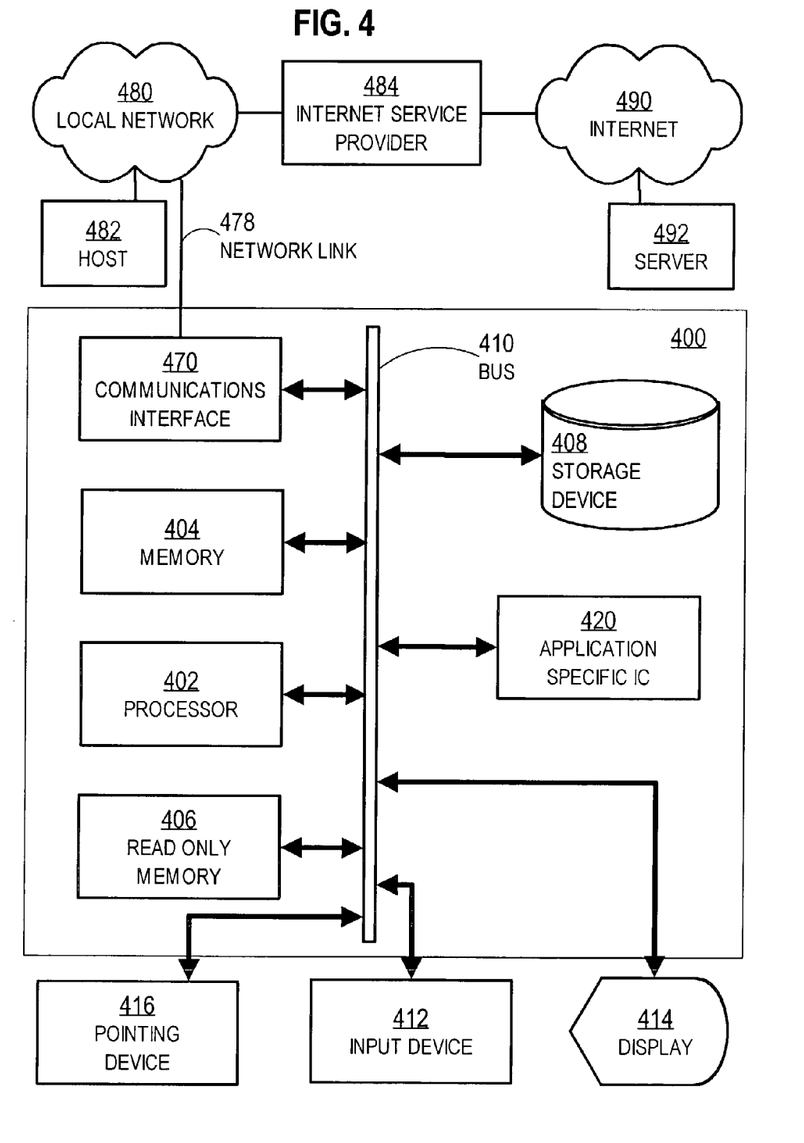
FIG. 4 is a block diagram that illustrates a computer system 400 upon which an embodiment of the invention may be implemented.

FIG. 4 is a block diagram that illustrates a computer system 400 upon which an embodiment of the invention may be implemented. Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular and atomic interactions. For example, north and south magnetic fields, or a zero and nonzero electric voltage, represent two states (0, 1) of a binary digit (bit). A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitute computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

Information, including instructions, is provided to the bus 410 for use by the processor from an external input device 412, such as a keyboard containing alphanumeric keys operated by a human user, or a sensor. A sensor detects conditions in its vicinity and transforms those detections into signals compatible with the signals used to represent information in computer system 400. Other external devices coupled to bus 410, used primarily for interacting with humans, include a display device 414, such as a cathode ray tube (CRT) or a liquid crystal display (LCD), for presenting images, and a pointing device 416, such as a mouse or a trackball or cursor direction keys, for controlling a position of a small cursor image presented on the display 414 and issuing commands associated with graphical elements presented on the display 414.

In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display 414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 400 also includes one or more instances of a communications interface 470 coupled to bus 410. Communication interface 470 provides a two-way communication coupling to a variety of external devices that operate with their own processors, such as printers, scanners and external disks. In general the coupling is with a network link 478 that is connected to a local network 480 to which a variety of external devices with their own processors are connected. For example, communication interface 470 may be a parallel port or a serial port or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends and receives electrical, acoustic or electromagnetic signals, including infrared and optical signals, that carry information streams, such as digital data. Such signals are examples of carrier waves.

The term computer-readable medium is used herein to refer to any medium that participates in providing instructions to processor 402 for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 478 typically provides information communication through one or more networks to other devices that use or process the information. For example, network link 478 may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides information representing video data for presentation at display 414.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420, may be used in place of or in combination with software to implement the invention. Thus, embodiments of the invention are not limited to any specific combination of hardware and software.

The signals transmitted over network link 478 and other networks through communications interface 470, which carry information to and from computer system 400, are exemplary forms of carrier waves. Computer system 400 can send and receive information, including program code, through the networks 480, 490 among others, through network link 478 and communications interface 470. In an example using the Internet 490, a server 492 transmits program code for a particular application, requested by a message sent from computer 400, through Internet 490, ISP equipment 484, local network 480 and communications interface 470. The received code may be executed by processor 402 as it is received, or may be stored in storage device 408 or other non-volatile storage for later execution, or both. In this manner, computer system 400 may obtain application program code in the form of a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to an infra-red signal, a carrier wave serving as the network link 478. An infrared detector serving as communications interface 470 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for circumventing jamming of receivers for a global positioning system (GPS), the method comprising the steps of:
   determining that a receiver is being jammed by a jamming signal not originating from the GPS;
   responsive to determining the jamming signal, transmitting a first signal from a portable unit including the receiver to a component of a second positioning system that is different from the GPS; and
   receiving from the second positioning system a second signal that includes data that indicates a position for the portable unit determined in the second positioning system based at least in part on the first signal;
   wherein said step of transmitting the first signal further comprises including first data in the first signal for authenticating the portable unit as an authorized user of the second positioning system; and
   wherein said step of transmitting the first signal further comprises transmitting the first signal in a narrow beam that impinges on the component of the second positioning system and that does not impinge on a source of the jamming signals.

2. The method of claim 1, said step of receiving the second signal further comprising receiving the second signal in a narrow beam that impinges on the portable and that does not impinge on a source of the jamming signals.

3. The method of claim 1, said step of receiving the second signal further comprising receiving the second signal that includes data that indicates the position for the portable unit within a threshold of precision for achieving a particular goal by an operational unit that includes the portable unit.

4. The method of claim 3, wherein the threshold of precision is less precise than a precision of the GPS.

5. The method of claim 1, further comprising, after performing said step of transmitting the first signal and before performing said step of receiving the second signal, the steps of:
   receiving from the second positioning system a third signal that includes data that indicates another signal should be sent from the portable unit; and
   transmitting a fourth signal from the portable unit to the second positioning system in response to the third signal.

6. The method of claim 5, said step of transmitting the fourth signal further comprising including in the fourth signal information about an operational unit that includes the portable unit.

7. The method of claim 1, wherein:
   the data that indicates the position for the portable unit is encrypted to be secure from a source of the jamming signals; and
   the method further comprises decrypting the data that indicates position.

8. The method of claim 1, said step of transmitting the first signal further comprising including in the first signal information about an operational unit that includes the portable unit.

9. The method of claim 1, said step of determining that the receiver is being jammed by the jamming signal includes determining the receiver is receiving signals that contain random data from which GPS satellite identification information can not be detected.

10. A method for circumventing jamming of receivers for a global positioning system (GPS), the method comprising the steps of:
   receiving, at a component of a second positioning system that is different from the GPS, a first signal from a portable unit including a receiver for the GPS, which portable unit has determined the receiver is being jammed by a jamming signal not originating from the GPS and transmitted the first signal responsive to determining the jamming signal;
   determining a position for the portable unit based at least in part on the first signal; and
   transmitting to the portable unit a second signal that includes data that indicates the position for the portable unit;
   wherein said step of receiving the first signal further comprises authenticating the portable unit as an authorized user of the second positioning system based at least in part on first data included in the first signal; and
   wherein said step of receiving the first signal further comprises receiving the first signal in a narrow beam that impinges on a component of the second positioning system and that does not impinge on a source of the jamming signals.

11. The method of claim 10, said step of transmitting the second signal further comprising transmitting the second signal in a narrow beam that impinges on the portable unit and that does not impinge on a source of the jamming signals.

12. The method of claim 10, said step of determining the position further comprising determining the position for the portable unit within a threshold of precision for achieving a particular goal by an operational unit that includes the portable unit.

13. The method of claim 12, wherein the threshold of precision is less precise than a precision of the GPS.

14. The method of claim 10, further comprising, after performing said step of receiving the first signal and before performing said step of transmitting the second signal, the steps of:
transmitting to the portable unit a third signal that includes data that indicates another signal should be sent from the portable unit; and
receiving a fourth signal from the portable unit.

15. The method of claim 10, further comprising generating the data that indicates the position for the portable unit by encrypting the position for the portable unit.

16. The method of claim 10, said step of receiving the first signal further comprising receiving in the first signal information about an operational unit that includes the portable unit.

17. The method of claim 10, wherein:
said step of transmitting the second signal further comprises including, in the second signal, data that indicates a request for information about an operational unit that includes the portable unit; and
the method further comprises the step of receiving from the portable unit, in response to the second signal, a third signal including data that indicates information about the operational unit.

18. The method of claim 10, further comprising:
transmitting to the portable unit a third signal that includes data that indicates a request for information about an operational unit that includes the portable unit; and
the method further comprises the step of receiving from the portable unit, in response to the third signal, a fourth signal that includes data that indicates information about the operational unit.

19. A computer-readable medium carrying one or more sequences of instructions for circumventing jamming of receivers for a global positioning system (GPS), wherein execution of the one or more sequences of instructions by one or more processors causes the one or more processors to perform the steps of:
receiving, at a component of a second positioning system that is different from the GPS, a first signal from a portable unit that includes a receiver for the GPS, which portable unit has determined the receiver is being jammed by a jamming signal not originating from the GPS and transmitted the first signal responsive to determining the jamming signal;
determining a position for the portable unit based at least in part on the first signal; and
causing a transmitter to transmit to the portable unit a second signal that includes data that indicates the position for the portable unit;
wherein said step of receiving the first signal further comprises authenticating the portable unit as an authorized user of the second positioning system based at least in part on first data included in the first signal; and
wherein said step of receiving the first signal further comprises receiving the first signal in a narrow beam that impinges on a component of the second positioning system and that does not impinge on a source of the jamming signals.

* * * * *